United States Patent
Connelly et al.

(10) Patent No.: US 8,490,906 B2
(45) Date of Patent: Jul. 23, 2013

(54) FOOD RICER

(75) Inventors: Timothy Connelly, Brooklyn, NY (US); Vincent Faivre d'Arcier, New York, NY (US); Paul Katz, New York, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 278 days.

(21) Appl. No.: 13/044,252

(22) Filed: Mar. 9, 2011

(65) Prior Publication Data

US 2012/0228417 A1    Sep. 13, 2012

(51) Int. Cl.
*A47J 17/00* (2006.01)

(52) U.S. Cl.
USPC ........ 241/169; 100/110; 100/234; 241/169.2; 241/89.2

(58) Field of Classification Search
CPC ....................................................... A47J 19/04
USPC .............. 241/169, 169.2, 262, DIG. 27, 88.4, 241/89.2, 92, 95; 100/234, 243, 110, 116; 99/495, 506
See application file for complete search history.

(56) References Cited

U.S. PATENT DOCUMENTS

| | | |
|---|---|---|
| 343,809 A | 6/1886 | Frary |
| 456,937 A | 8/1891 | Blinn |
| 1,224,134 A | 5/1917 | Burford |
| 1,878,924 A | 9/1932 | Will |
| 1,885,873 A | 11/1932 | Stein |
| 2,385,966 A | 10/1945 | Bottinelli |
| 2,396,959 A | 3/1946 | Malmquist |
| 2,776,616 A | 1/1957 | Sarossy |
| 4,003,522 A | 1/1977 | Buckley |
| 4,346,823 A | 8/1982 | Eppenbach |
| 4,821,481 A | 4/1989 | Woodman |
| D447,019 S | 8/2001 | Wong |
| 6,467,709 B1 * | 10/2002 | Hattori ............................ 241/30 |
| 6,520,436 B1 | 2/2003 | Herren |
| 7,766,197 B2 | 8/2010 | Getsy |
| 2005/0139704 A1 * | 6/2005 | Liao et al. ...................... 241/169 |
| 2005/0178865 A1 | 8/2005 | Krause |
| 2009/0078131 A1 | 3/2009 | So et al. |
| 2009/0193981 A1 | 8/2009 | Webb |

FOREIGN PATENT DOCUMENTS

WO    9403091    2/1994

OTHER PUBLICATIONS

International Search Report and Written Opinion of PCT/US2011/039407 dated Oct. 11, 2011.
chefdepot.com, Food Mill Homepage and Products, http://chefdepot.com/foodmill.htm, pp. 1-15; publically available as of Oct. 9, 2009.

(Continued)

*Primary Examiner* — Dana Ross
*Assistant Examiner* — Matthew G Katcoff

(57) ABSTRACT

A food ricer including a hopper, a first plate having a first pattern of apertures defining a bottom of the hopper, and a second plate having a second pattern of apertures rotatably coupled to the bottom of the hopper. The second plate is preferably rotatable with respect to the first plate. The first and second patterns of apertures being eccentric or non-concentric with respect to each other to allow for the geometric orientation of one pattern of apertures to be quartered, bifurcated, and aligned with respect to the other pattern of apertures for achieving varying degrees of coarseness upon rotation of the second plate with respect to the first plate.

18 Claims, 6 Drawing Sheets

OTHER PUBLICATIONS chefsresource.com, Kuhn Rikon Potato Ricer, http://www.chefresource.com/kuhn-rikon-potato-ricer-white.html, 2 pages; publically available as of Oct. 9, 2009.

cookware.com, Paderno World Cuisine 42556-03-Potato Ricer with Three Discs in Stainless Steel, http://www.cookware.com/Paderno-World-Cuisine-42566-03-WCS4066.html, 3 pages; publically available as of Oct. 9, 2009.

cooking.com , OXO Food Mill, http://www.cooking.com/products/shprodde.asp?SKU=102384, 4 pages ; publically available as of Oct. 9, 2009.

cooking.com, Potato Presser by MIU, http://www.cooking.com/products/shprodde.asp?SKU=587183, 3 pages; publically available as of Oct. 9, 2009.

cooking.com, Rotary Food Mill by RSVP Intl., http://www.cooking.com/products/shprodde.asp?SKU=435420, 4 pages; publically available as of Oct. 9, 2009.

cooking.com, Potato Ricer by RSVP Intl., http://www.cooking.com/products/shprodde.asp?SKU=127125, 4 pages; publically available as of Oct. 9, 2009.

\* cited by examiner

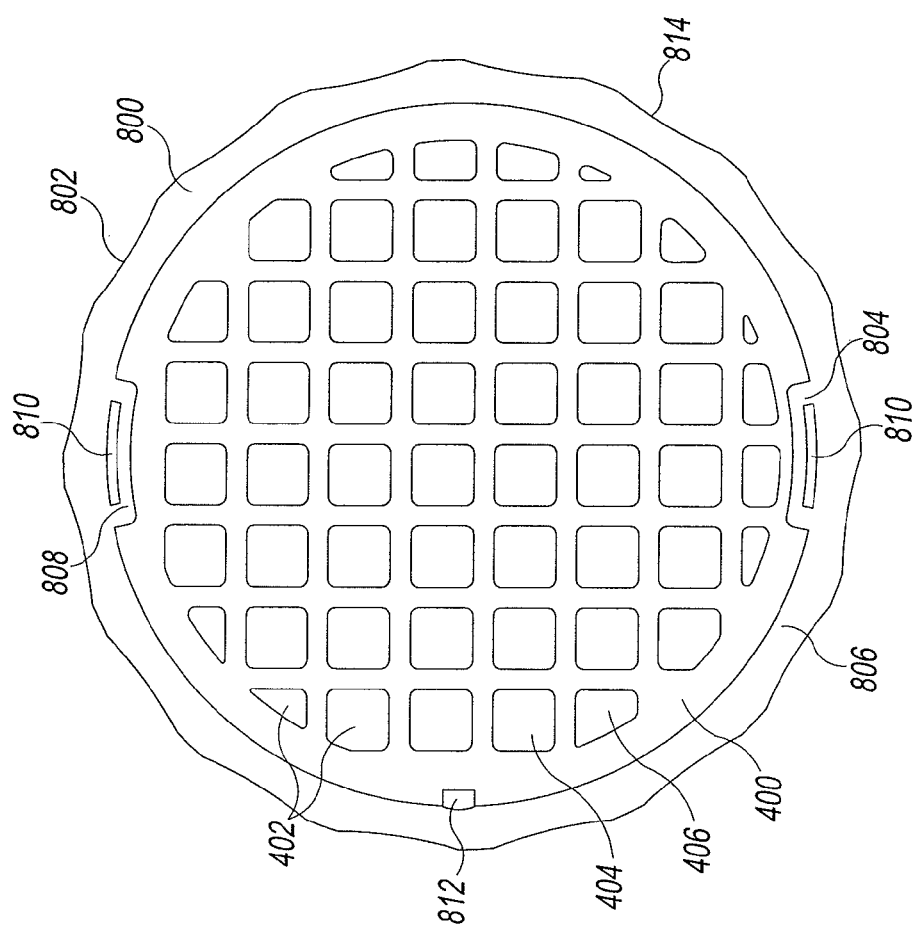

FOOD RICER

FIELD

The present disclosure relates to an apparatus for processing food. More specifically, the present disclosure relates to an apparatus for processing food by extrusion.

BACKGROUND

Food processing devices have been developed for the purpose of chopping, mashing, squeezing, and/or juicing various types of food, such as but not limited to fruits and vegetables. Food processing devices, specifically food or potato ricers, are kitchen utensils used for mashing various types of food.

Generally, a food or potato ricer includes a hopper perforated with small holes and/or a plate perforated with small holes on the base of the hopper, handles and a disc or plunger, such as disclosed in U.S. Pat. Nos. 343,809 and 1,885,873. Cooked food such as potatoes or other food are mashed or riced by inserting them into the hopper and extruding them through the holes with the plunger.

One important feature of food or potato ricers is the size of the holes the food to be mashed or riced is to be extruded through. A smaller hole will produce a finer extrusion setting while a larger hole will produce a coarser extrusion setting. Some food or potato ricers include a single integrated plate in the hopper, which results in a single fixed extrusion setting. Other food or potato ricers include interchangeable plates, each plate having different uniformly sized holes, that may be removed and inserted into the hopper to enable a user to mash or rice food at a desired extrusion setting. However, it can be burdensome and even messy for a user to change the plates from a first plate to a second plate, especially when the user desires one food extruded at one setting and a different food extruded at a second setting.

SUMMARY

Illustrative embodiments of the disclosure relate to an apparatus for processing food. More specifically, the present disclosure relates to a food ricer having a rotating bezel for extruding food at a desired extrusion setting.

In an illustrative embodiment, the food ricer includes a hopper into which food to be extruded is placed. Preferably, a first lever is coupled to the hopper, a second lever is pivotally attached to the first lever or hopper, and a plunger is pivotally attached to the second lever in engaging relationship with an interior of the hopper. Preferably, the second lever is configured to pivot toward and away from the first lever. When the second lever is pivoted toward the first lever, the plunger engages the interior of the hopper. When the second lever is pivoted away from the first lever, the plunger is removed from engagement with the interior of the hopper.

In an illustrative embodiment, the food ricer includes a first plate having a first pattern of apertures defining a bottom of the hopper and a second plate having a second pattern of apertures rotatably coupled to the bottom of the hopper forming a rotating bezel. Preferably, the second plate is rotatable with respect to the first plate. In an illustrative embodiment, the outside edges of the first and second plates are concentric, and the first and second patterns of apertures follow eccentric paths of rotation or are not concentric with respect to each other to allow for the geometric orientation of one of the patterns of apertures to be approximately aligned, bifurcated, or quartered with respect to the other pattern of apertures, upon rotation of the rotating bezel, for varying degrees of coarseness. In a 0 degree position for example, one pattern of apertures substantially quarters the other pattern of apertures. A 90 degree rotation of one plate with respect to the other plate provides for one pattern of apertures to substantially bifurcate the other pattern. Similarly, an additional 90 degree rotation of one plate with respect to the other plate, resulting in a 180 degree rotation from the 0 degree position, causes the first and second patterns of apertures to substantially align. Accordingly, the food ricer is capable of achieving an extra coarse, coarse, or fine extrusion setting, depending on the angle of rotation of the second plate with respect to the first plate.

In an illustrative embodiment, a connector rotatably couples the second plate defining a bottom of the connector to the bottom of the hopper. In one illustrative embodiment, the second plate is integrally or monolithically formed from a single piece with the connector resulting in a unitary rotating bezel. In another illustrative embodiment, the second plate is disposed in a bottom portion of the connector forming the rotating bezel.

Preferably, the connector includes a first engaging arm disposed on an interior wall of the connector and a second engaging arm disposed on the interior wall of the connector opposite the first engaging arm. In the illustrative embodiment, the hopper includes an external lip surrounding a bottom edge of the hopper. The first engaging arm and second engaging arm of the connector are configured to snap or slide over the external lip of the hopper to rotatably couple the connector to the bottom of the hopper.

In an illustrative embodiment, the hopper further includes detents on an external surface of the bottom edge of the hopper and the connector includes detent protrusions on the interior wall of the connector that communicate with the detents on the hopper when the connector is coupled to the hopper. Preferably, the detents and detent protrusions are configured to communicate with one another when the second pattern of apertures are in the 0 degree position, the 90 degree position, and the 180 degree position with respect to the first pattern of apertures.

The above features as well as additional features and aspects of the food ricers disclosed herein will become apparent from the following detailed description of illustrative embodiments. In addition, other features and advantages will be or become apparent to one skilled in the art upon examination of the following drawings and detailed description. It is intended that all such additional features and advantages be included within this description and be within the scope of the present disclosure.

BRIEF DESCRIPTION OF THE DRAWINGS

The disclosure is illustrated in the figures of the accompanying drawings which are meant to be exemplary and not limiting, in which like references are intended to refer to like or corresponding parts, and in which:

FIG. 8 illustrates an embodiment of a rotatable connector of the food ricer.

DETAILED DESCRIPTION

Detailed embodiments of a food ricer are disclosed herein, however, it is to be understood that the disclosed embodiments are merely exemplary of the food ricer, which may be embodied in various forms. Therefore, specific functional details disclosed herein are not to be interpreted as limiting, but merely as a basis for the claims and as a representative basis for teaching one skilled in the art to variously employ the present disclosure.

Figure 1:
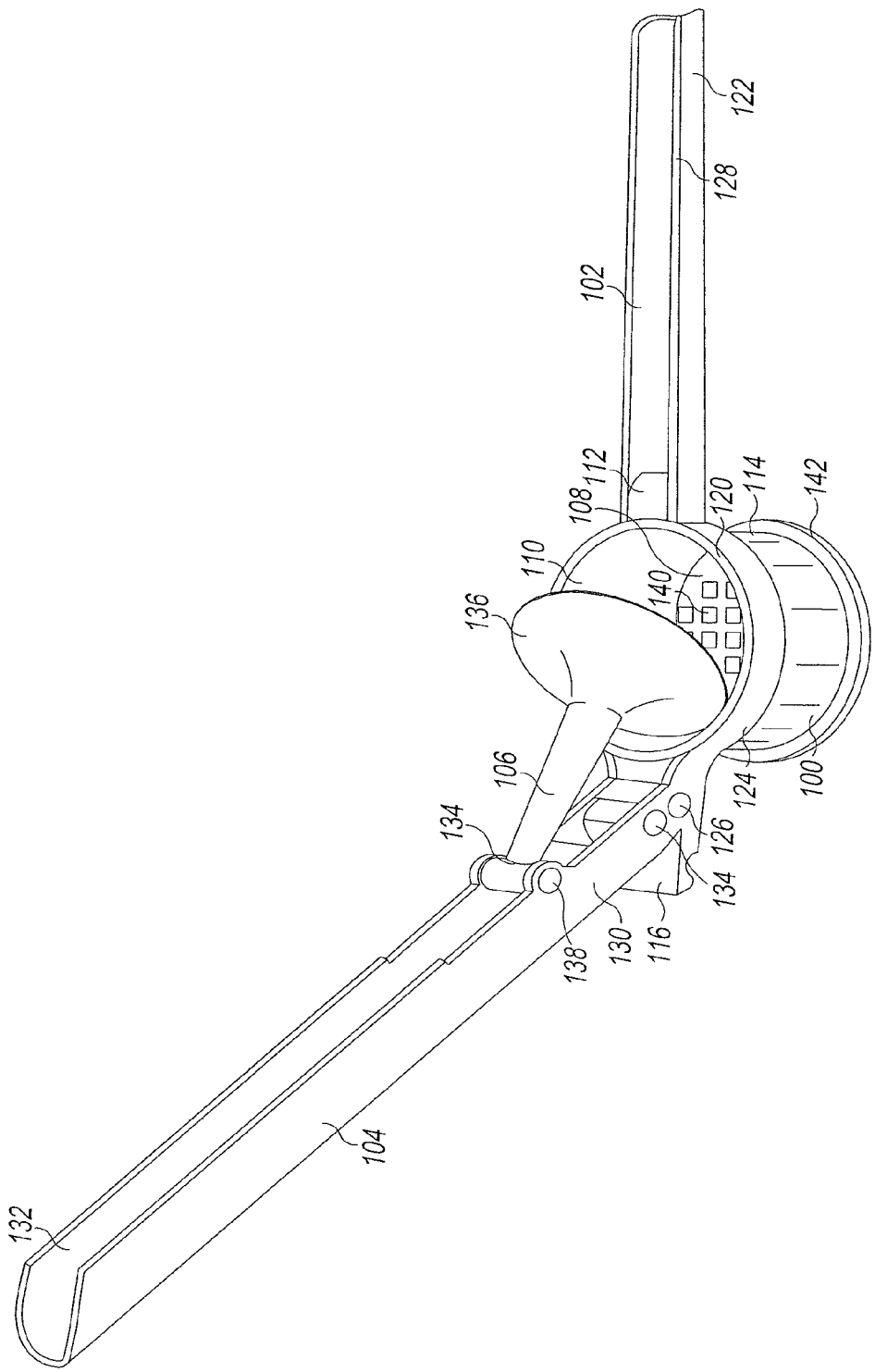
FIG. 1 illustrates an embodiment of a food ricer in an open or loading position.
Figure 2:
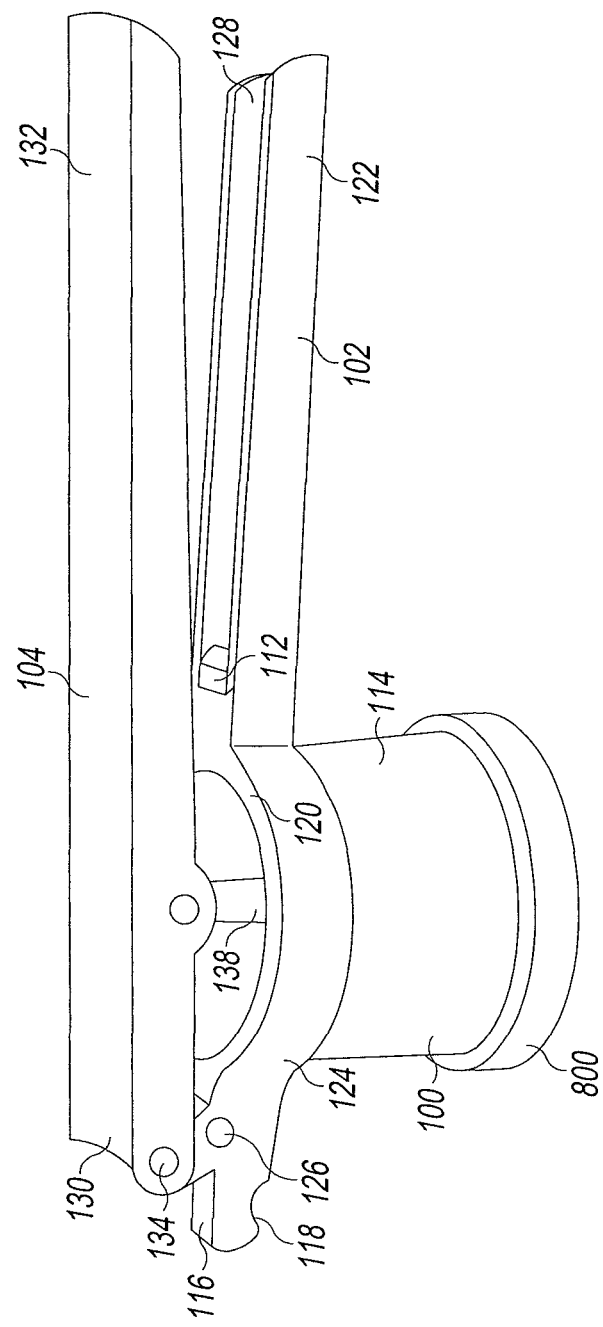
FIG. 2 illustrates an embodiment of the food ricer in a closed position.

A food ricer according to an illustrative embodiment is described with reference to FIGS. 1 and 2. FIGS. 1 and 2, illustrate the food ricer in an open or loading position and a closed position, respectively. The food ricer includes a hopper 100 into which food to be extruded is placed, a first lever 102, a second lever 104, a plunger 106, and a first plate 108 defining a bottom of the hopper 100. Preferably, the first lever 102 is coupled to the hopper 100, the second lever 104 is pivotally attached to the first lever 102, and the plunger 106 is pivotally attached to the second lever 104 in engaging relationship with an interior 110 of the hopper 100. Preferably, the second lever 104 is configured to pivot toward and away from the first lever 102. When the second lever 104 is pivoted toward the first lever 102, the plunger 106 engages the interior 110 of the hopper 100 to cause food located in the hopper 100 to be extruded. When the second lever 104 is pivoted away from the first lever 102 the plunger 106 is removed from engagement with the interior 110 of the hopper 100 to allow for the loading of food into the hopper 100.

In an illustrative embodiment, the hopper 100 includes a first protruding portion 112 on an exterior surface 114 of the hopper 100 and a second protruding portion 116 on the exterior surface 114 of the hopper 100 opposite the first protruding portion 112. The first protruding portion 112 and/or second protruding portion 116 may be integrally or monolithically formed with the hopper 100 or may be coupled to the hopper 100 by fasteners, such as but not limited to rivets, screws, bolts, adhesives, nails, and other fasteners of the type.

The second protruding portion 116 may further include a resting notch 118 on a bottom portion of the second protruding portion 116. The resting notch 118 may be used to engage an edge of a container to rest the food ricer on while extruding food therefrom, such as but not limited to a bowl, bucket, pot, pan, cup, and other containers of the type. The hopper 100 may include an external ridge 120 around a top exterior portion of the hopper 100.

In an illustrative embodiment, the first lever 102 includes a handle portion 122 and a coupling portion 124. As illustrated, the handle portion 122 engages with the first protruding portion 112 of the hopper 100 and the coupling portion 124 couples to the hopper 100 around the exterior surface 114 below the external ridge 120 of the hopper 100 and engages with the second protruding portion 116 of the hopper 100. Preferably, the coupling portion 124 is fastened to the second protruding portion 116 of the hopper 100 opposite the handle portion 122 by a fastener 126. The fastener 126 may be a fastener such as but not limited to a pin, rivet, screw, nail, bolt, and other fasteners of the type. The handle portion 122 of the first lever 102 may include a channel 128 into which the first protruding portion 112 of the hopper 100 may be inserted to prevent the handle portion 122 from becoming distorted with respect to the remainder of the first lever 102. The channel 128 may extend any length along the handle portion 122 or may extend a portion of the length along the handle portion 122 to allow the first protruding portion 112 to engage the channel 128.

In an illustrative embodiment, the handle portion 122 of the first lever 102 may be fastened to the first protruding portion 112 of the hopper 100 by a fastener, such as but not limited to a pin, rivet, screw, nail, bolt, and other fasteners of the type. In this illustrative embodiment, the first lever 102 may not necessarily include the coupling portion 124, since the handle portion 122 can securely couple the first lever 102 to the hopper 100. In an illustrative embodiment, the first lever 102 may be integrally or monolithically formed with the hopper 100. Alternatively, the coupling portion 124 may be connected or integrally formed to itself opposite the handle portion 122. In this embodiment, the hopper 100 may me inserted into the coupling portion 124 and the external ridge 120 of the hopper 100 may engage the coupling portion 124 preventing the hopper 100 from sliding through the coupling portion 124. Further, the hopper 100 may be removable with respect to the first lever 102, such as for cleaning purposes.

In an illustrative embodiment, the second lever 104 includes a proximal end 130 and a distal end 132. As illustrated, the proximal end 130 is pivotally connected to the coupling portion 124 of the first lever 102 by a fastener 134. The fastener 134 may be a fastener such as but not limited to a pin, rivet, screw, nail, bolt, and other fasteners of the type. The proximal end 130 of the second lever 104 may be forked allowing the second protruding portion 116 of the hopper 100 to be inserted into the forked region of the proximal end 130. The fastener 134 may extend through the coupling portion 124 of the first lever 102 and the second protruding portion 116 of the hopper 100. In another illustrative embodiment, the proximal end 130 of the second lever 104 may be pivotally connected to the second protruding portion 116 of the hopper 100 by the fastener 134. Preferably, the second lever 104 is configured to pivot toward and away from the first lever 102. When the second lever 104 is pivoted toward the first lever 102 a length extending along the second lever 104 to the distal end 132 is substantially aligned with a length of the handle portion 122 of the first lever 102.

In an illustrative embodiment, the second lever 104 may include a channel extending the entire length or a portion of the length extending from proximal end 130 to the distal end 132. Alternatively, the second lever 104 may be solid along the length extending from proximal end 130 to the distal end 132.

In an illustrative embodiment, the plunger 106 includes a shaft portion 134 and a disc portion 136. The plunger 106, including the shaft portion 134 and disc portion 136, is preferably integrally or monolithically formed. As illustrated, the shaft portion 134 is pivotally connected to the second lever 104 between the proximal end 130 and the distal end 132 of the second lever 104 by a fastener 138 in a position allowing the disc portion 136 to be inserted into the hopper 100 when the second lever 104 is pivoted toward the first lever 102. The fastener 138 may be a fastener such as but not limited to a pin, rivet, screw, nail, bolt, and other fasteners of the type. Preferably, the disc portion 136 is slightly smaller than the interior 110 of the hopper 100, and the shaft portion 134 has a length that allows the disc portion 136 to reach the first plate 108 when the second lever 104 is pivoted toward the first lever 102.

In an illustrative embodiment, the first plate 108 defines a bottom of the hopper 100. The first plate 108 may be constructed of any suitable material, such as but not limited to a metal material (for example stainless steel), a plastic material, and any other material of the type. The first plate 108 may be integrally or monolithically formed with the hopper 100, or may be disposed in the hopper 100 and may be fixed within or removable from the hopper 100. It may be desirable to have the first plate 108 disposed in the hopper 100 in a removable manner to allow replacement of the first plate 108. As illustrated, the first plate 108 includes a first pattern of apertures 140. When the second lever 104 is pivoted toward the first lever 102 the disc portion 136 of the plunger 106 engages the interior 110 of the hopper 100 to cause food located in the hopper 100 to be extruded through the first pattern of apertures 140 in the first plate 108. When the second lever 104 is pivoted away from the first lever 102 the plunger 106 is removed from engagement with the interior 110 of the hopper 100 to allow for the loading of food into the hopper 100.

In an illustrative embodiment, the first lever 102 and the second lever 104 my include grip portions (not shown). The grip portions may be disposed on or integrally formed with external surfaces of the first lever 102 and second lever 104. The grip portions may be desirable to a user of the food ricer and provide for a comfortable and non-slip area for the user to hold and pivot the first lever 102 and second lever 104 when using the food ricer.

In an illustrative embodiment, a food ricer includes a first plate 300 and a second plate 400 through which food is to be extruded. Embodiments of the first plate 300 and second plate 400 are described with reference to FIGS. 3 and 4. The first plate 300 and second plate 400 may be constructed of any suitable material, such as but not limited to a metal material (for example stainless steel), a plastic material, and any other material of the type. The first plate 300 and second plate 400 may be coupled to the food ricer in a rotatable manner allowing the first plate 300 and second plate 400 to rotate relative to one another. Rotation of one plate with respect to the other may cause one pattern of apertures to partially obstruct or occlude the other pattern of apertures resulting in settings having varying degrees of coarseness. Although, the plates are herein the first plate 300 and second plate 400, it should be appreciated that the first and second plates may be reversed.

Figure 3:
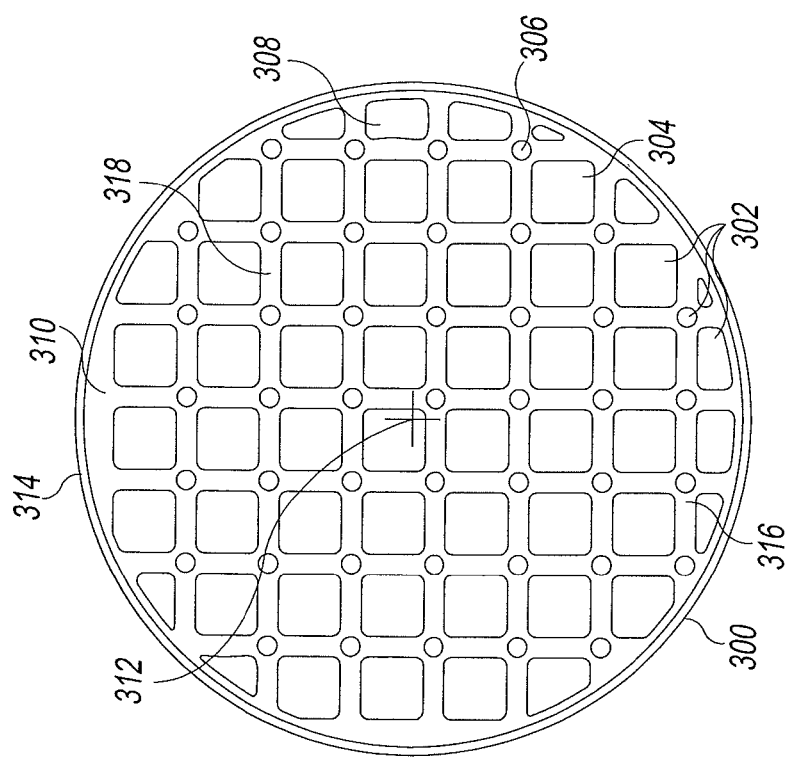
FIG. 3 illustrates an embodiment of a first plate.

In an illustrative embodiment, with reference to FIG. 3, the first plate 300 includes a first pattern of apertures 302. Preferably, the first pattern of apertures 302 includes an array of primary apertures 304 and secondary apertures 306 defined by a lattice 316. Although the first plate 300 is described as having a first pattern of apertures 302 including secondary apertures 306, the secondary apertures may be considered a separate patter of apertures, such as a second pattern of apertures or a third pattern of apertures.

As illustrated, the primary apertures 304 are substantially square and the secondary apertures 306 are substantially circular. Further, the primary apertures may include fractioned apertures 308. The fractioned apertures 308 are apertures formed from fractions of the primary apertures 304 and are generally located around a periphery of the first plate 300. The fractioned apertures 308 may be apertures resulting from the primary apertures 304 being fractioned by a first boarder 310 around an outer edge of the first plate 300. The secondary apertures 306 may be smaller in size relative to the primary apertures 304 and may provide for a finer extrusion setting. The primary apertures 304 and the secondary apertures 306 may be laid out in a grid pattern or rectangular array on the first plate 300. As illustrated, approximately 7-8 primary apertures 304, equally spaced from one another, extend across a diameter of the first plate 300 to the first boarder 310 around the outer edge of the first plate 300. Further, the secondary apertures 306 may be positioned between the primary apertures 304, such as at intersections of the lattice 316. Preferably, the secondary apertures 306 are positioned between the corners of the primary apertures 304 and/or centrally located between sets of four primary apertures 304. The secondary apertures 306 may be between an upper right corner of one primary aperture 304 and a lower left corner of another primary aperture 304. The secondary apertures 306 may be between an upper left corner of one primary aperture 304 and a lower right corner of another primary aperture 304.

Figure 4:
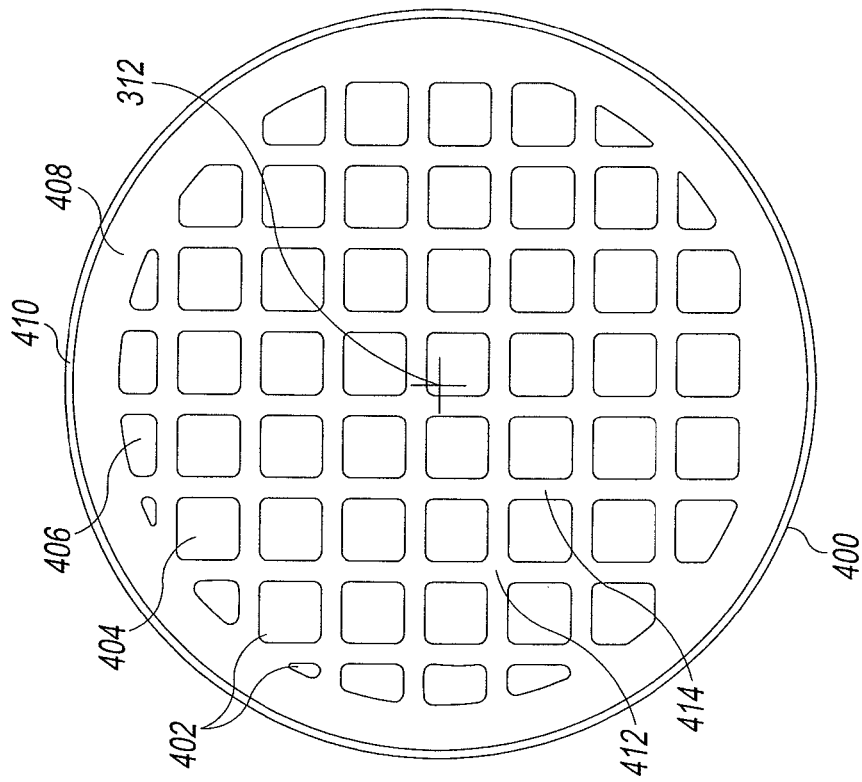
FIG. 4 illustrates an embodiment of a second plate.

In an illustrative embodiment, with reference to FIG. 4, the second plate 400 includes a second pattern of apertures 402. Preferably, the second pattern of apertures 402 include an array of primary apertures 404 defined by a lattice 412. As illustrated, the primary apertures 404 are substantially square apertures and further include fractioned apertures 406. The fractioned apertures 406 are apertures formed from fractions of the primary apertures 404 and are generally located around a periphery of the second plate 400. The fractioned apertures 406 may be apertures resulting from the primary apertures 404 being fractioned by a second boarder 408 around an outer edge of the second plate 400. The primary apertures 404 may be laid out in a grid pattern or rectangular array on the second plate 400. As illustrated, approximately 7-8 primary apertures 404, equally spaced from one another, extend across a diameter of the second plate 400 to the second boarder 408 around the outer edge of the second plate 400. The second boarder 408 of the second plate 400 may be larger than the first boarder 310 of the first plate 300. Preferably, the primary apertures 404 of the second plate 400 have about the same dimension as the primary apertures 304 of the first plate 300 and are substantially identical to the primary apertures 304 of the first pattern of apertures 302.

In an illustrative embodiment, the first plate 300 includes a first outside edge 314 and the second plate 400 includes a second outside edge 410. Preferably, the outside edges 314 and 410 of the first plate 300 and the second plate 400 are concentric. However, the first pattern of apertures 302 in the first plate 300 and the second pattern of apertures 402 in the second plate 400 follow eccentric paths of rotation allowing for the geometric orientation of the first pattern of apertures 302 in the first plate 300 to be occluded with respect to the second pattern of apertures 402 in the second plate 400.

In an illustrative embodiment, the first plate 300 includes a first cutting grid or lattice 316 having arms 318 and the second plate 400 includes a second cutting grid or lattice 412 having arms 414. The first and second cutting grids or lattices 316 and 412 separate or define the apertures of the first and second patterns of apertures 302 and 402, respectively. Preferably, the first pattern of apertures 302 in the first plate 300 can be oriented to align with, bifurcate, or quarter the second pattern of apertures 402 in the second plate 400, upon rotation of one plate with respect to the other. More particularly, one or more arms 318 of the first cutting grid or lattice 316 can be oriented to occlude one or more primary apertures 404 within the second pattern of apertures 402 in the second plate 400.

As illustrated in FIGS. 3 and 4, the first plate 300 and the second plate 400 have an axis of rotation 312. Preferably, the first plate 300 and the second plate 400 share the same axis of rotation 312 when the plates are aligned on top of one another because the outside edges 314 and 410 of the first plate 300 and the second plate 400 are concentric. Typically, the axis of rotation 312 is centrally located with respect to the first plate 300 and the second plate 400 and is set by the diameter of each of the plates 300 and 400. However, the first pattern of apertures 302 in the first plate 300 and the pattern of the second pattern of apertures 402 in the second plate 400 are offset from the axis of rotation 312 and follow eccentric paths of rotation. Therefore, the axis of rotation 312 appears in different locations within the first pattern of apertures 302 in the first plate 300 and within the second pattern of apertures 402 in the second plate 400.

The eccentricity of the relationship between the first pattern of apertures 302 in the first plate 300 and the second pattern of apertures 402 in the second plate 400 when the first plate 300 and the second plate 400 are arranged, superimposed, or positioned against one another in a stacking manner according to illustrative embodiments are described with reference to FIGS. 5-7A. Preferably, the first plate 300 and the second plate 400 allow for a selectable ricing pattern (for example between three patterns—a fine, coarse, and extra coarse pattern) upon superimposition of the first plate 300 and the second plate 400. In an illustrative embodiment, referring to FIGS. 5 and 5A, the first plate 300 and second plate 400 are in a 0 degree position 500. As illustrated in FIG. 5A, a single primary aperture 404 in the second plate 400 and a single primary aperture 304 in the first plate 300 are not aligned with one another in the 0 degree position 500. Rather, due to the eccentricity of the patterns only the corners of the primary aperture 404 and the primary aperture 304 overlap in the 0 degree position 500.

Figure 5:
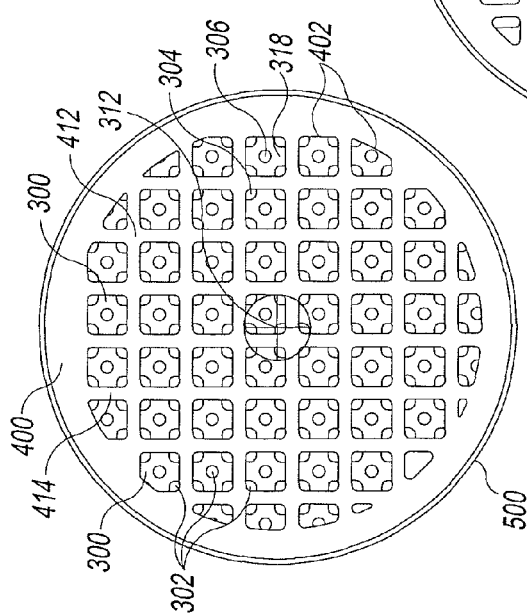
FIG. 5 illustrates an embodiment of a relationship between a first pattern of apertures in the first plate and a second pattern of apertures in the second plate when the first plate and the second plate are arranged in a 0 degree position.
Figure 5A:
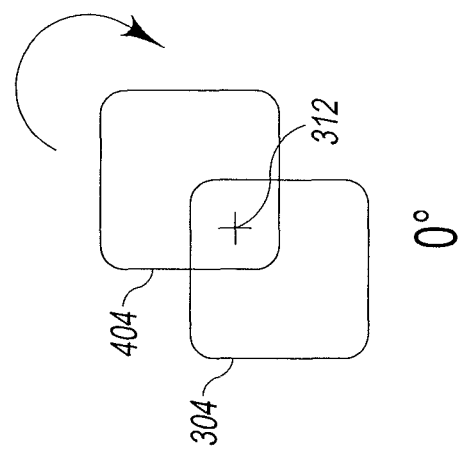
FIG. 5A illustrates an embodiment of a relationship between an aperture in the first plate and an aperture in the second plate when the first plate and the second plate are arranged in the 0 degree position.

As illustrated in FIG. 5, in the 0 degree position 500, one pattern of apertures, either the first pattern of apertures 302 or the second pattern of apertures 402 substantially quarters the other pattern resulting in a fine extrusion setting. More particularly, in the 0 degree position 500, the arms 318 of the first cutting grid or lattice 316 of the first plate 300 are centered at an intersection point to partially occlude the primary apertures 404 in the second plate 400. The secondary apertures 306 in the first plate 300 are unobstructed and centered within the primary apertures 404 and communicate with the second pattern of apertures 402 in the second plate 400. Further, the arms 414 of the second cutting grid or lattice 412 of the second plate 400 are centered at an intersection point to partially occlude the primary apertures 304 in the first plate 300. Thus, the corners of four primary apertures 304 in the first plate 300 are positioned to communicate with four corners of a single primary aperture 404 in the second plate 400.

Figure 6:
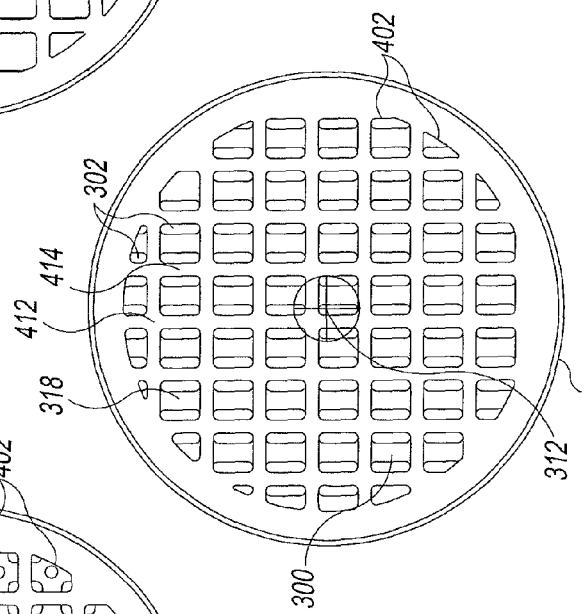
FIG. 6 illustrates an embodiment of a relationship between the first pattern of apertures in the first plate and the second pattern of apertures in the second plate when the first plate and the second plate are arranged in a 90 degree position.
Figure 6A:
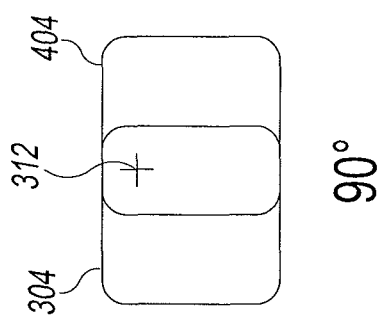
FIG. 6A illustrates an embodiment of a relationship between the aperture in the first plate and the aperture in the second plate when the first plate and the second plate are arranged in the 90 degree position.

In an illustrative embodiment, referring to FIGS. 6 and 6A, the first plate 300 and the second plate 400 are in a 90 degree position 600. In the 90 degree position 600, one plate is rotated 90 degrees about the axis of rotation 312 with respect to the other plate, relative to the 0 degree position 500. As illustrated, one plate is rotated relative to the other about the axis of rotation 312 in a clockwise direction 90 degrees relative to the 0 degree position 500. However, it should be appreciated by one skilled in the art that the plates may be configured to rotate in a counter clockwise direction to achieve the same result. The 90 degree position 600 causes, one pattern of apertures, either the first pattern of apertures 302 or the second pattern of apertures 402, to occlude and substantially bisect the other pattern resulting in a coarse extrusion setting.

As illustrated in FIG. 6A, the single primary aperture 404 in the second plate 400 and the single primary aperture 304 in the first plate 300 are not aligned with one another in the 90 degree position 600. Rather, due to the eccentricity of the patterns only about half of the primary aperture 404 and the primary aperture 304 overlap in the 90 degree position 600.

As illustrated in FIG. 6, in the 90 degree position 600, the arms 318 of the first cutting grid or lattice 316 of the first plate 300 partially occlude and substantially bisect the primary apertures 404 in the second plate 400. Typically, the arms 318 of the first cutting grid or lattice 316 of the first plate 300 are positioned in the center of a primary aperture 404 substantially bisecting the primary aperture 404. Thus, about half of two primary apertures 304 in the first plate 300 are positioned to communicate with a single primary aperture 404 in the second plate 400. Further, in the 90 degree position 600 the secondary apertures 306 in the first plate 300 are occluded by the arms 414 of the second cutting grid or lattice 412 of the second plate 400.

Figure 7:
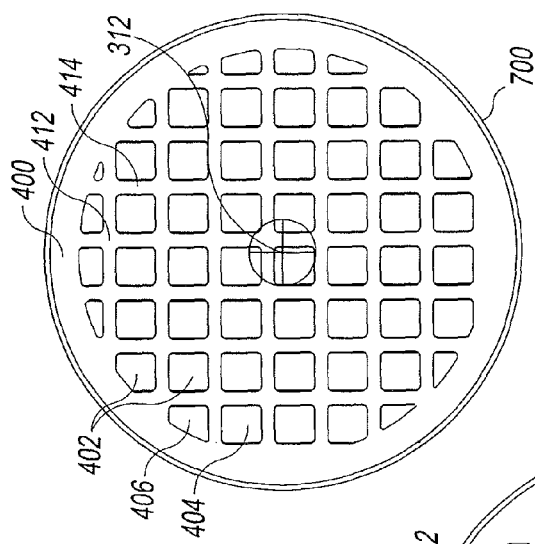
FIG. 7 illustrates an embodiment of a relationship between the first pattern of apertures in the first plate and the second pattern of apertures in the second plate when the first plate and the second plate are arranged in a 180 degree position.

In an illustrative embodiment, referring to FIG. 7, the first plate 300 and second plate 400 are in a 180 degree position 700. In the 180 degree position 700, one plate is rotated about the axis of rotation 312 with respect to the other plate 180 degrees, relative to the 0 degree position 500. As illustrated, one plate is rotated relative to the other about the axis of rotation 312 in a clockwise direction 180 degrees relative to the 0 degree position 500. However, it should be appreciated by one skilled in the art that the plates may be configured to rotate in a counter clockwise direction to achieve the same result. The 180 degree position 700 causes, one pattern of apertures, either the first pattern of apertures 302 or the second pattern of apertures 402, to substantially align with the other pattern resulting in a extra coarse extrusion setting.

Figure 7A:
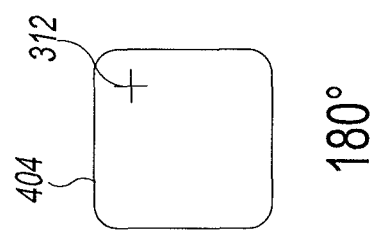
FIG. 7A illustrates an embodiment of a relationship between the aperture in the first plate and the aperture in the second plate when the first plate and the second plate are arranged in the 180 degree position.

As illustrated in FIGS. 7 and 7A, the single primary aperture 404 in the second plate 400 and the single primary aperture 304 in the first plate 300 are substantially aligned with one another in the 180 degree position 700. Due to the eccentricity of the patterns the primary aperture 404 and the primary aperture 304, and the arms 414 and arms 318 of the first and second cutting grids or lattices 316 and 412 to substantially align with each other in the 180 degree position 700.

Accordingly, the food ricer is capable of achieving varying degrees of coarseness depending on the angle of rotation or position the plates are in with respect to one another. Although the plates are discussed above as having three positions, it should be appreciated by one skilled in the art that the first plate 300 and second plate 400 may have patterns of apertures laid out in alternative eccentric or non-concentric patterns to allow for 1-2 positions, 1-3 positions, 1-4 positions, 1-5 positions 1-6 positions, or other number of positions. It should also be appreciated by one skilled in the art that more that two plates may be utilized and be rotatable with respect to each other to achieve a multitude of extrusion settings. Further, although the first plate 300 and second plate 400 are described above as having substantially square apertures, substantially circular apertures, and fractioned apertures, it should be appreciated by one skilled in the art that any shape and/or combination of shapes of apertures, such as but not limited to circular, oval, square, rectangular, triangular, octagonal, and other shapes, may be utilized to achieve a multitude of extrusion settings.

Referring back to FIGS. 1 and 2, in an illustrative embodiment, the first plate 108 defining a bottom of the hopper 100 may be the first plate 300 described above with reference to FIGS. 3-7. The second plate 400 may be rotatably coupled to the bottom of the hopper 100 allowing the first plate 300 and the second plate 400 to rotate with respect to one another as described above with reference to FIGS. 5-7A. In another illustrative embodiment, the first plate 108 defining a bottom of the hopper 100 may be the second plate 400 described above with reference to FIGS. 3-7. The first plate 300 may be rotatably coupled to the bottom of the hopper 100 allowing the first plate 300 and the second plate 400 to rotate with respect to one another as described above with reference to FIGS. 5-7A.

In an illustrative embodiment, the food ricer may include a connector configured to rotatably couple the first plate 300 or the second plate 400 to the bottom of the hopper 100. The connector may rotatably couple the first plate 300 or the second plate 400 to the bottom of the hopper 100 in any suitable manner, such as but not limited to threads, a screw, a bolt, a rivet, and a snap-on mechanism.

In an illustrative embodiment, the connector configured to rotatably couple the second plate 400 to the bottom of the hopper 100 according to an illustrative embodiment is described with reference to FIG. 8. As illustrated, the second plate 400 is disposed in the connector 800 defining a bottom of the connector 800 forming a rotatable bezel 802. The second plate 400 may be removably disposed or fixedly disposed in the connector 800. Alternatively, the second plate 400 may be integrally or monolithically formed from a single piece with the connector 800 resulting in a unitary rotatable bezel 802. When the rotatable bezel 802 is coupled to the hopper 100, the rotatable bezel 802 may be rotated to configure the first plate 300 and the second plate 400 to be in the 0 degree, 90 degree, and 180 degree positions (500, 600, and 700) with respect to one another, as described with reference to FIGS. 5-7A.

In an illustrative embodiment, the connector 800 includes a first engaging arm 804 disposed on an interior wall 806 of the connector 800 and a second engaging arm 808 disposed on the interior wall 806 of the connector 800 opposite the first engaging arm 804. The first engaging arm 804 and the second engaging arm 808 may further include apertures 810. The apertures 810 may be a result of the molding process of the connector 800. In one example, the apertures 810 may allow for the connector 800 to be removed from a formed mold, such as those commonly used in manufacturing.

In this illustrative embodiment, with reference to FIG. 1, the hopper 100 includes an external lip 142 surrounding a bottom edge of the hopper 100. The first engaging arm 804 and second engaging arm 808 of the connector 800 are configured to snap or slide over the external lip 142 of the hopper 100 to rotatably couple the connector 800 to the bottom of the hopper 100. Although, the connector 800 is illustrated and described as having two engaging arms, it should be appreciated by one skilled in the art that the connector 800 may include any number of (more or less than two) engaging arms.

In an illustrative embodiment, the hopper 100 further includes one or more detents on an external surface of the bottom edge of the hopper 100 and the connector 800 includes one or more detent protrusions 812 on the interior wall 806 of the connector 800 that communicate with the detents on the hopper 100 when the connector 800 is coupled to the hopper 100. In another illustrative embodiment, the detent protrusions 812 may be located on one or more of the engaging arms 804 and 808.

Preferably, the detents and detent protrusions 812 are configured to communicate with one another when the first and second plates 300 and 400 are configured to be in the 0 degree, 90 degree, and 180 degree positions (500, 600, and 700) with respect to one another, as described with reference to FIGS. 5-7A. However, it should be appreciated by one skilled in the art that the one or more detents and detent protrusions may be positioned to communicate with one another when the first and second plates 300 and 400 are in any number of positions with respect to one another.

In an illustrative embodiment, the connector 800 may include a grip portion 814 around an exterior edge of the connector 800. The grip portion 814 may allow a user to grip the connector 800 in a comfortable and non-slip manner to rotate the connector 800 or rotatable bezel 802 to place the first plate 300 and the second plate 400 in a desired position. As illustrated, the grip portion 814 of the connector 800 is a crowned pattern. However, it should be appreciated by one skilled in the art that the grip portion 814 may be any pattern, and/or may include padding, a non-slip coating, and other grip materials or any combination of grip materials.

Although, the first plate 300, the second plate 400, the hopper 100, and the connector 800 are illustrated as being circular in shape, it should be appreciated by one skilled in the art that any shape, such as but not limited to circular, oval, square, rectangular, triangular, octagonal, and other shapes, may be utilized so long as the rotatable interaction is not compromised. Further, as described and illustrated above the second plate 400 rotates relative to the first plate 300. However, it should be appreciated by one skilled in the art that the first plate 300 may be configured to be rotatable with respect to the second plate 400 in accordance with the above description.

While the food ricer has been described and illustrated in connection with preferred embodiments, many variations and modifications will be evident to those skilled in the art and may be made without departing from the spirit and scope of the disclosure. For example, it should be appreciated by one skilled in the art that the aperture patterns and rotatable interaction between the first plate 300 and second plate 400 may be implemented in other types of food ricers and other utensils of the type. Further, any part, portion, or element described above may be constructed from any suitable material, such as but not limited to a plastic material, a metal material (for example stainless steel), and any other material of the type. The disclosure is thus not to be limited to the precise details of methodology and/or construction set forth above as such variations and modification are intended to be included within the scope of the disclosure.

What is claimed is:

1. A food ricer comprising:
 a first plate including a first pattern of apertures; and
 a second plate rotatably disposed against the first plate, the second plate including a second pattern of apertures that is substantially identical to the first pattern of apertures and a third pattern of apertures offset from the second pattern of apertures,
 a selectable ricing pattern configured by superposition of the first pattern of apertures, the second pattern of apertures and the third pattern of apertures, the selectable ricing pattern including:
  a first ricing pattern when the second plate is disposed at a first angular displacement relative to the first plate, a second ricing pattern when the second plate is disposed at a second angular displacement relative to the first plate, and a third ricing pattern when the second plate is disposed at a third angular displacement relative to the first plate;

an axis of rotation of the second plate extending through the center of the first plate and the second plate, the first pattern of apertures and second pattern of apertures offset from the axis of rotation so that the apertures of the second plate follow eccentric paths upon rotation of the second plate.

2. The food ricer of claim 1, wherein the first pattern of apertures and the second pattern of apertures each include a rectangular array of substantially rectangular apertures defined by a rectangular lattice; and wherein the third pattern of apertures is disposed through intersections in the rectangular lattice of the second plate.

3. The food ricer of claim 1, wherein the first ricing pattern comprises a superposition of the first pattern of apertures in substantial alignment with the second pattern of apertures, and occlusion of the third pattern of apertures by the lattice of the first plate.

4. The food ricer of claim 3, wherein the second ricing pattern is configured when the second plate is displaced by 90 degrees relative to the first plate, in which the second ricing pattern comprises a substantial bisection of the first pattern of apertures by the lattice of the second plate and a substantial bisection of the second pattern of apertures by the lattice of the first plate, and in which the third pattern of apertures is occluded by the lattice of the first plate.

5. The food ricer of claim 4, wherein the third ricing pattern is configured when the second plate is displaced by 180 degrees relative to the first plate, in which the third ricing pattern comprises the third pattern of apertures aligned with the first pattern of apertures.

6. The food ricer of claim 5, wherein the third ricing pattern further comprises:
intersections of the lattice of the first plate centered on apertures of the second pattern of apertures, and
intersections of the lattice of the second plate centered on apertures of the first pattern of apertures.

7. A food ricer comprising:
a hopper having a bottom portion;
a first plate disposed in said bottom portion of said hopper, said first plate including a first pattern of apertures, said first pattern of apertures including first primary apertures and secondary apertures, said secondary apertures being centrally located between sets of four first primary apertures; and
a second plate rotatably coupled to said bottom portion of said hopper, said second plate including a second pattern of apertures, said second pattern of apertures including second primary apertures, said second pattern of apertures in said second plate and said first pattern of apertures in said first plate being eccentric with respect to a rotational axis of the second plate and being laid out in a grid pattern or rectangular array.

8. A food ricer comprising:
a hopper including a bottom portion having an exterior surface and an external lip on said exterior surface;
a first plate including a first pattern of apertures and a cutting grid separating said apertures of said first pattern of apertures, said first plate disposed in said bottom portion of said hopper;
a connector rotatably coupled to said exterior surface of said bottom portion of said hopper, said connector including at least one engaging arm on an interior surface of said connector, said at least one engaging arm configured to engage said external lip of said hopper and couple said connector to said hopper; and
a second plate including a second pattern of apertures, said second plate disposed in said connector, said second pattern of apertures in said second plate and said first pattern of apertures in said first plate being eccentric, said cutting grid of said first plate configured to partially occlude said apertures of said second pattern of apertures in said second plate upon rotation of said connector with respect to said hopper.

9. The food ricer according to claim 8, wherein said connector is configured to rotate between a first position, a second position, and a third position with respect to said hopper, said cutting grid of said first plate configured to partially occlude and substantially quarter said apertures of said second pattern of apertures in said second plate in said first position, said cutting grid of said first plate configured to partially occlude and substantially bisect said apertures of said second pattern of apertures in said second plate in said second position, said apertures of said first pattern of apertures in said first plate configured to substantially align with said apertures of said second pattern of apertures in said second plate in said third position.

10. The food ricer according to claim 9, wherein said first pattern of apertures further includes first primary apertures and secondary apertures, said secondary apertures being smaller in size relative to and centrally located between sets of four first primary apertures, said secondary apertures of said first plate configured to be centered in said apertures of said second pattern of apertures in said second plate in said first position.

11. The food ricer of claim 1, further comprising:
a hopper, wherein the first plate connects with the hopper;
a first lever coupled to the hopper; and
a second lever pivotally attached to at least one of the first lever and the hopper.

12. The food ricer of claim 1, further comprising a hopper and a connector rotatably coupling the first plate or the second plate to the hopper.

13. The food ricer of claim 12, wherein the connector rotatably couples the second plate to the hopper.

14. The food ricer of claim 13, wherein the connector is a rotatable bezel.

15. The food ricer of claim 7, wherein the secondary apertures in the first plate are smaller in size relative to the primary apertures.

16. The food ricer of claim 7, further comprising a first lever coupled to the hopper.

17. The food ricer of claim 16, further comprising a second lever pivotally attached to at least one of the first lever and the hopper.

18. The food ricer of claim 17, further comprising a plunger pivotally attached to the second lever.

* * * * *